US012092361B2

(12) United States Patent
Lin et al.

(10) Patent No.: US 12,092,361 B2
(45) Date of Patent: Sep. 17, 2024

(54) HUMIDIFIER

(71) Applicant: Gree Electric Appliances, Inc. of Zhuhai, Zhuhai (CN)

(72) Inventors: Zhirong Lin, Zhuhai (CN); Daying Lai, Zhuhai (CN); Guoliang Li, Zhuhai (CN); Donghai Liu, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 403 days.

(21) Appl. No.: 17/641,032

(22) PCT Filed: Aug. 27, 2020

(86) PCT No.: PCT/CN2020/111621

§ 371 (c)(1),
(2) Date: Mar. 7, 2022

(87) PCT Pub. No.: WO2021/068677

PCT Pub. Date: Apr. 15, 2021

(65) Prior Publication Data

US 2022/0325907 A1 Oct. 13, 2022

(30) Foreign Application Priority Data

Oct. 8, 2019 (CN) ......................... 201910961014.2

(51) Int. Cl.
*F24F 6/14* (2006.01)
*B01F 23/21* (2022.01)
(Continued)

(52) U.S. Cl.
CPC ............ *F24F 6/14* (2013.01); *B01F 23/2133* (2022.01); *B01F 23/23* (2022.01); *F24F 8/50* (2021.01);
(Continued)

(58) Field of Classification Search
CPC .......... B01F 23/23; B01F 23/2133; F24F 6/14
See application file for complete search history.

(56) References Cited

U.S. PATENT DOCUMENTS

2019/0083671 A1* 3/2019 McDonnell ........... A61M 21/00
2019/0226697 A1 7/2019 Kim et al.

FOREIGN PATENT DOCUMENTS

CN 105972742 A 9/2016
CN 207610317 U 7/2018
(Continued)

OTHER PUBLICATIONS

International Search Report for corresponding PCT/CN2020/111621 mailed Nov. 27, 2020, 3 Pages.

*Primary Examiner* — Robert A Hopkins
(74) *Attorney, Agent, or Firm* — Armstrong Teasdale LLP

(57) ABSTRACT

Some embodiments of the present disclosure provide a humidifier, the humidifier includes: a humidifier body, provided with a first air inlet; and an inner tub, provided in the humidifier body and internally provided with an air passage, a fan being provided in the air passage, the inner tub being provided with a second air inlet, the second air inlet and the first air inlet being communicated with an air inlet of the fan, and the portion of the inner tub above the second air inlet being provided with a blocking surface, which is provided opposite to at least a part of the first air inlet.

15 Claims, 6 Drawing Sheets

(51) Int. Cl.
*B01F 23/213* (2022.01)
*B01F 23/23* (2022.01)
*F24F 8/50* (2021.01)
*F24F 13/20* (2006.01)

(52) U.S. Cl.
CPC ........ *F24F 13/20* (2013.01); *F24F 2006/143* (2013.01); *F24F 2013/205* (2013.01)

(56) References Cited

FOREIGN PATENT DOCUMENTS

| | | | |
|---|---|---|---|
| CN | 109237690 | A | 1/2019 |
| CN | 208936393 | U | 6/2019 |
| CN | 110145831 | A | 8/2019 |
| CN | 110671774 | A | 1/2020 |
| CN | 210772629 | U | 6/2020 |
| KR | 100225110 | B1 * | 10/1999 |

* cited by examiner

HUMIDIFIER

CROSS-REFERENCE TO RELATED APPLICATION

The present disclosure is a National Stage application of PCT/CN2020/111621, filed on Aug. 27, 2021, which claims priority to Chinese Patent Application No. 201910961014.2, filed to the China National Intellectual Property Administration on Oct. 8, 2019 and entitled "Humidifier", the disclosure of which are hereby incorporated by reference in their entirety.

TECHNICAL FIELD

The present disclosure relates to a technical field of household appliances, and specifically, to a humidifier.

BACKGROUND

Currently, since an environment becomes dry when appliances such as a heater and an air conditioner are used indoors, especially in winter. The weather is dry, the environment will become very dry when the heater is used, which seriously affects a comfort of a human body (for example, difficulty breathing, eye pain, dry skin, and the like). With an improvement of a living standard of people, people have higher and higher requirements for their own life, work and office environments, so that more and more people use humidifiers.

However, during an using of a humidifier provided in the art known to inventors, inconvenience is brought to a life of people due to a noise of a fan during operation.

SUMMARY

Therefore, the technical problem to be resolved by the present disclosure is to provide a humidifier with small noise and capable of improving user experience, to overcome defects in the art known to inventors that a noise of a humidifier affects user experience.

Some embodiments of the present disclosure provided a humidifier, the humidifier includes a humidifier body and an inner tub.

The humidifier body is provided with a first air inlet.

The inner tub is disposed inside the humidifier body. An air passage is disposed inside the inner tub. A fan is disposed in the air passage. The inner tub is provided with a second air inlet. The second air inlet and the first air inlet are communicated with an air inlet of the fan. A portion of the inner tub above the second air inlet is provided with a blocking surface, the blocking surface opposites to at least part of the first air inlet.

In some embodiments, a plane at which the first air inlet is located and a plane at which the second air inlet is located are disposed spatially at an angle.

In some embodiments, the plane at which the first air inlet is located and the plane at which the second air inlet is located are disposed spatially perpendicular to each other.

In some embodiments, an aromatherapy cavity is formed between the humidifier body and the inner tub.

In some embodiments, a plurality of support strips are disposed at a bottom of the aromatherapy cavity. The plurality of support strips are provided with a through hole.

In some embodiments, an end of the first air inlet extends to a plane at which bottom end surfaces of the plurality of support strips are located.

In some embodiments, the humidifier further includes an electrical element. The electrical element is disposed in the humidifier body and located outside the air passage.

In some embodiments, the air passage includes an air passage body. An accommodating cavity is enclosed by the air passage body. The accommodating cavity is communicated with the second air inlet. The fan is disposed in the accommodating cavity.

In some embodiments, the fan has two air inlets. The two air inlets are respectively disposed on two sides of the fan.

In some embodiments, the humidifier further includes an atomizing device. The atomizing device is disposed in the humidifier body. An air outlet of the fan is disposed at the atomizing device.

In some embodiments, the humidifier further includes at least one drainage outlet. The at least one drainage outlet is disposed at a bottom of the air passage.

The technical solutions of the present disclosure have the following advantages.

1. The humidifier provided in the present disclosure includes: the humidifier body, provided with a first air inlet; and the inner tub, disposed inside the humidifier body. An air passage is disposed inside the inner tub. A fan is disposed in the air passage. The inner tub is provided with a second air inlet. The second air inlet and the first air inlet are communicated with an air inlet of the fan. A portion of the inner tub above the second air inlet is provided with a blocking surface, the blocking surface opposites to at least part of the first air inlet.

Through an analysis of a structure of a humidifier provided in the art known to inventors, it is found that a noise is mainly caused by a direct effect of an outside air on a fan, the fan accelerates high-speed air, the wind blows at a high speed and rubs against surrounding components, and vibration is generated during acceleration, which eventually leads to a generation of noise.

In the present disclosure, the portion of the inner tub above the second air inlet is provided with the blocking surface disposed opposite to at least part of the first air inlet, so that external air cannot directly enter the second air inlet after entering from the first air inlet on the humidifier body, but is blocked by the blocking surface to slow down the speed, so as to reduce air volume directly entering the second air inlet. Likewise, noise generated by vibration of the fan during operation cannot enter the atmosphere directly from the first air inlet when being transmitted outwards from the second air inlet, but can be blocked by the blocking surface, so that the noise cannot be directly transmitted out from the first air inlet, so as to reduce the noise of the humidifier during operation. Therefore, the humidifier can be quieter during usage, thereby improving user experience.

2. According to the humidifier provided in the present disclosure, the plane at which the first air inlet is located and the plane at which the second air inlet is located are not arranged spatially parallel to each other. Through the spatially non-parallel arrangement of the planes at which the first air inlet and the second air inlet are located, an air flow path needs to be turned before entering the air inlet of the fan from the second air inlet, so that the noise of the humidifier can be better prevented from affecting users. In addition, due to the long-time use of the humidifier, moisture increasingly accumulates in the air passage from the first air inlet and the second air inlet, to eventually cause water to remain on a base of the air passage. If water droplets stay at the air passage for a long time, damages are caused to the fan. Through the first air inlet and the second air inlet, the water droplets can be discharged out of the air passage, so that damages to the fan caused by the water droplets can be prevented, and the service life of the humidifier can be prolonged.

3. According to the humidifier provided in the present disclosure, the plane at which the first air inlet is located and the plane at which the second air inlet is located are arranged spatially perpendicular to each other. Through the spatially perpendicular arrangement of the planes at which the first air inlet and the second air inlet are located, an area of the blocking surface of the first air inlet is larger through the arrangement of the blocking surface, so that better effects of noise isolation can be achieved, and the arrangement of the planes at which the first air inlet and the second air inlet are located in space can be more convenient.

4. According to the humidifier provided in the present disclosure, the aromatherapy cavity is formed between the humidifier body and the inner tub. By forming the aromatherapy cavity between the humidifier body and the inner tub, the external air passes through the aromatherapy cavity when entering the air passage from the inner tub, so that the air can be fresher.

5. According to the humidifier provided in the present disclosure, the plurality of support strips are disposed at a bottom of the aromatherapy cavity. The support strips are provided with through holes. By arranging the support strips at the bottom of the aromatherapy cavity and providing the through holes on the support strips, the water droplets in the air passage can conveniently flow from the second air inlet to the first air inlet.

6. According to the humidifier provided in the present disclosure, the first air inlet extends to the plane at which the support strips are located. By extending the first air inlet to the plane at which the support strips are located, the water droplets can directly flow out of the humidifier from the first air inlet, so that the water droplets can be prevented from remaining in the humidifier.

7. The humidifier provided in the present disclosure further includes the electrical element. The electrical element is disposed in the humidifier body and located outside the air passage. By disposing the electrical element outside the air passage, the air passage can isolate the water droplets to the outside of the electrical element, so that the water droplets can be prevented from being in contact with the electrical element to cause potential safety hazards.

8. According to the humidifier provided in the present disclosure, the air passage includes the air passage body. The accommodating cavity is enclosed by the air passage body. The accommodating cavity is communicated with the second air inlet. The fan is disposed in the accommodating cavity. By disposing the air passage body, the accommodating cavity is enclosed by the air passage body, and the fan is disposed in the accommodating cavity, so that an air passage structure is simpler.

9. According to the humidifier provided in the present disclosure, the fan has two air inlets. The two air inlets are respectively disposed on two sides of the fan. By disposing two air inlets in the fan, and respectively disposing the air inlets on the two sides of the fan, air can simultaneously enter the two sides of the fan, which enlarges an air inlet area of the fan. Therefore, water mist in the humidifier can be blown higher by the fan, and a humidification area of the humidifier can be enlarged. In this way, the mist can be prevented from only blowing to accessories of the humidifier while not able to humidify a larger area. Therefore, a humidification effect is enhanced, and user experience is improved.

BRIEF DESCRIPTION OF THE DRAWINGS

In order to more clearly illustrate the specific implementations of the present disclosure or the technical solutions in the related art, the drawings used in the description of the specific implementations or the related art will be briefly described below. It is apparent that the drawings in the following descriptions are only some implementations of the present disclosure. Other drawings can be obtained from those skilled in the art according to these drawings without any creative work.

IN THE DRAWINGS

Figure 1:
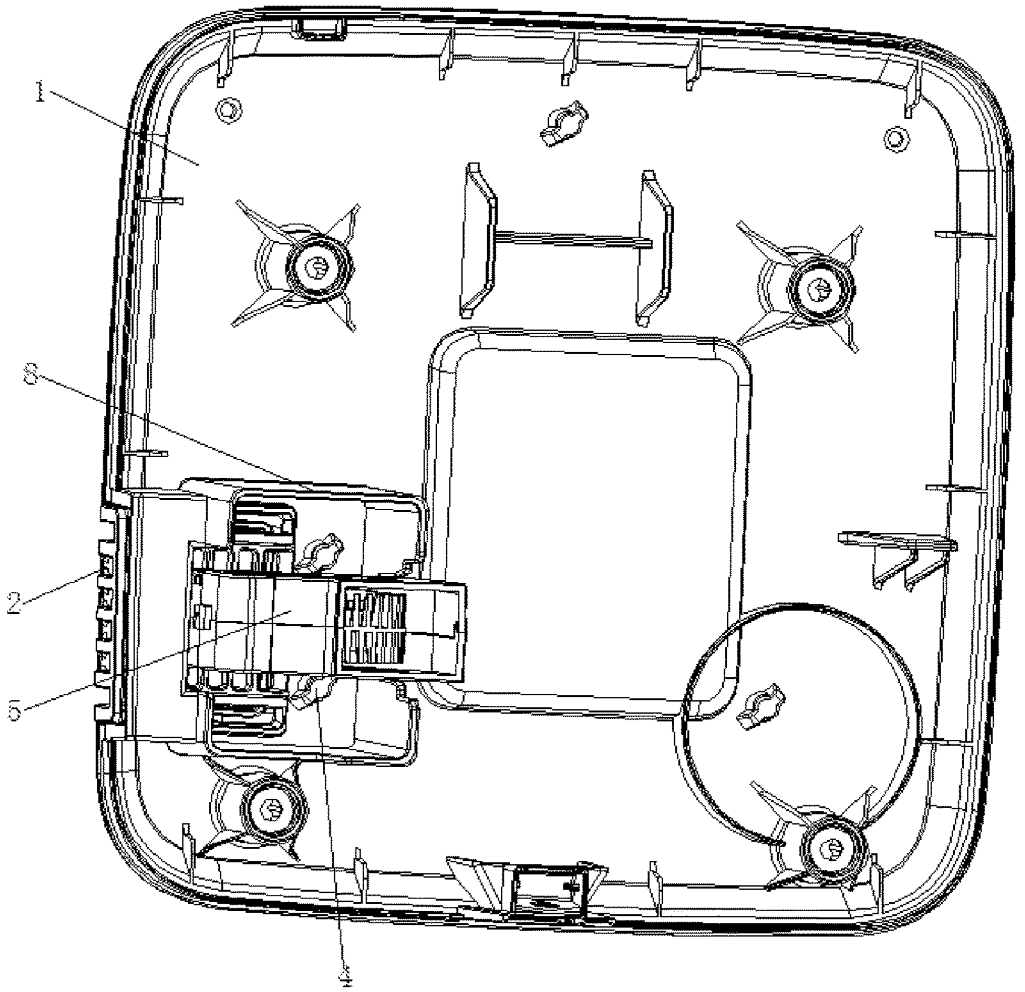
FIG. 1 illustrates a schematic structural diagram of a first portion of a humidifier in one direction according to the present disclosure.
Figure 2:
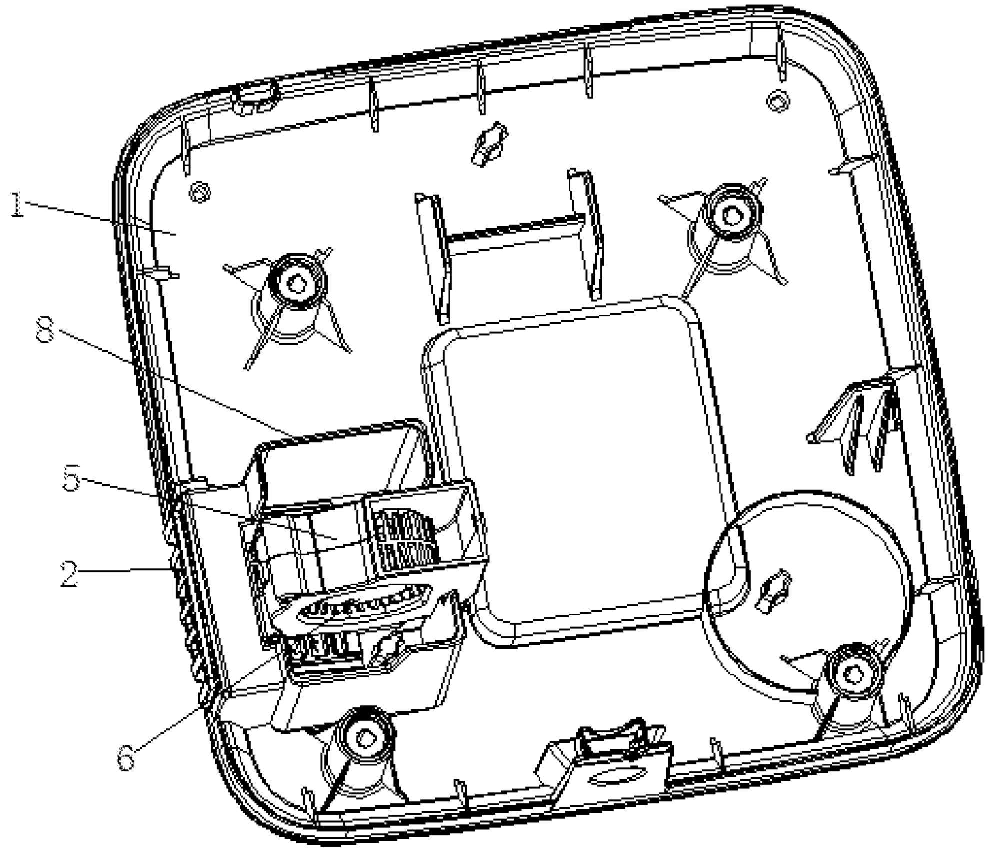
FIG. 2 illustrates a schematic structural diagram of a first portion of a humidifier in another direction according to the present disclosure.

1—Humidifier body; 2—First air inlet; 3—Second air inlet; 4—Drainage outlet; 5—Fan; 6—Air inlet; 7—Electrical element; 8—Air passage body; 9—Aromatherapy cavity; 10—Atomizing device; 11—Air outlet; 12—Inner tub; 13—Blocking surface; 14—Support strip.

DETAILED DESCRIPTION OF THE EMBODIMENTS

The technical solutions the present disclosure will be clearly and completely described below with reference to the drawings. It is apparent that the described embodiments are merely part of the embodiments of the present disclosure, not all the embodiments. Based on the embodiments in the present disclosure, all other embodiments obtained by those ordinary skilled in the art without creative work shall fall within the protection scope of the present disclosure.

In addition, the technical features involved in the different implementations of the present disclosure described below may be combined with each other so long as they do not conflict with each other.

As shown in FIG. 1 to FIG. 7, this embodiment provides a humidifier. The humidifier includes a humidifier body 1, an inner tub 12, an air passage and a fan 5.

The humidifier body 1 is provided with a first air inlet 2. The inner tub 12 is disposed inside the humidifier body 1. The air passage is disposed inside the inner tub 12. The fan 5 is disposed in the air passage. The inner tub 12 is provided with a second air inlet 3. The second air inlet 3 and the first air inlet 2 are communicated with an air inlet 6 of the fan 5. A portion of the inner tub 12 above the second air inlet 3 is provided with a blocking surface 13, the blocking surface 13 opposites to at least part of the first air inlet 2.

The portion of the inner tub 12 above the second air inlet 3 is provided with the blocking surface 13 disposed opposite to at least part of the first air inlet 2, so that external air cannot directly enter the second air inlet 3 after entering from the first air inlet 2 on the humidifier body 1, but is blocked by the blocking surface 13 to slow down the speed, so as to reduce air volume directly entering the second air inlet. Likewise, noise generated by vibration of the fan 5 during operation cannot enter the atmosphere directly from the first air inlet 2 when being transmitted outwards from the second air inlet 3, but can be blocked by the blocking surface 13, so that the noise cannot be directly transmitted out from the first air inlet 2, so as to reduce the noise of the humidifier during operation. Therefore, the humidifier can be quieter during usage, thereby improving user experience.

In this embodiment, a plane at which the first air inlet 2 is located and a plane at which the second air inlet 3 is located are arranged spatially at an angle. Through the spatially non-parallel arrangement of the planes at which the first air inlet 2 and the second air inlet 3 are located, an air flow path needs to be turned before entering the air inlet 6 of the fan from the second air inlet 3, so that the noise of the humidifier can be better prevented from affecting users. In addition, due to the long-time use of the humidifier, moisture increasingly accumulates in the air passage from the first air inlet 2 and the second air inlet 3, to eventually cause water to remain on a base of the air passage. If water droplets stay at the air passage for a long time, damages may be caused to the fan 5. Through the first air inlet 2 and the second air inlet 3, the water droplets can be discharged out of the air passage, so that damages to the fan 5 caused by the water droplets can be prevented, and the service life of the humidifier can be prolonged. As an alternative implementation, in some embodiments, the second air inlet 3 is disposed opposite to the first air inlet 2. In this case, the first air inlet 2 is parallel to the second air inlet 3. In addition, a top end of the second air inlet 3 is lower than a top end of the first air inlet 2. Due to the presence of the blocking surface 13, the air flowing through the first air inlet 2 cannot completely enter the second air inlet 3, so that the air volume entering the fan 5 can be reduced, thereby reducing the noise.

Figure 3:
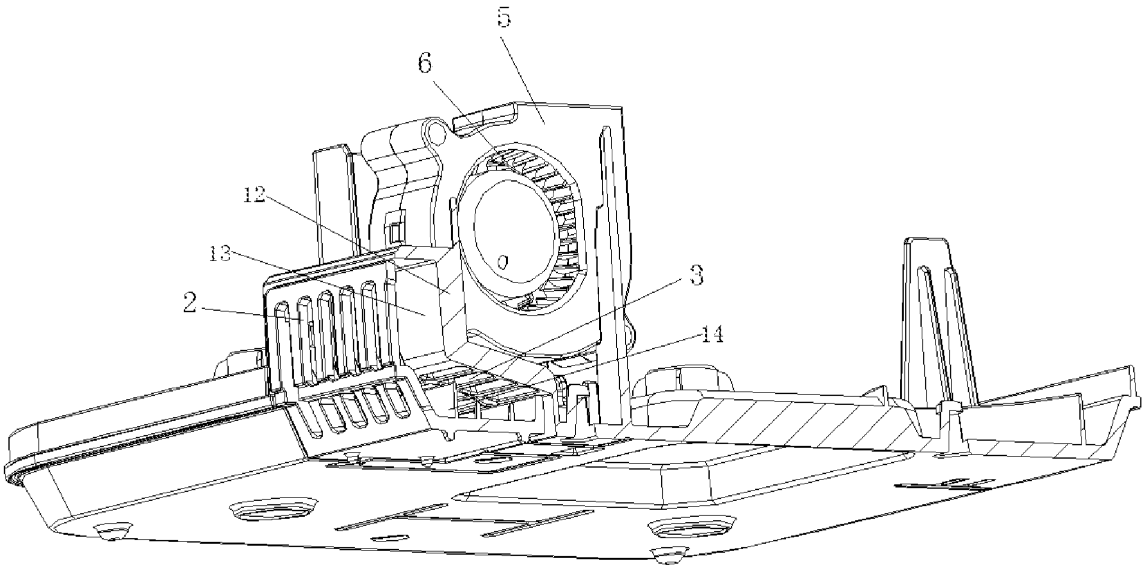
FIG. 3 illustrates a structural cross-sectional view of a first portion of a humidifier according to the present disclosure.
Figure 4:
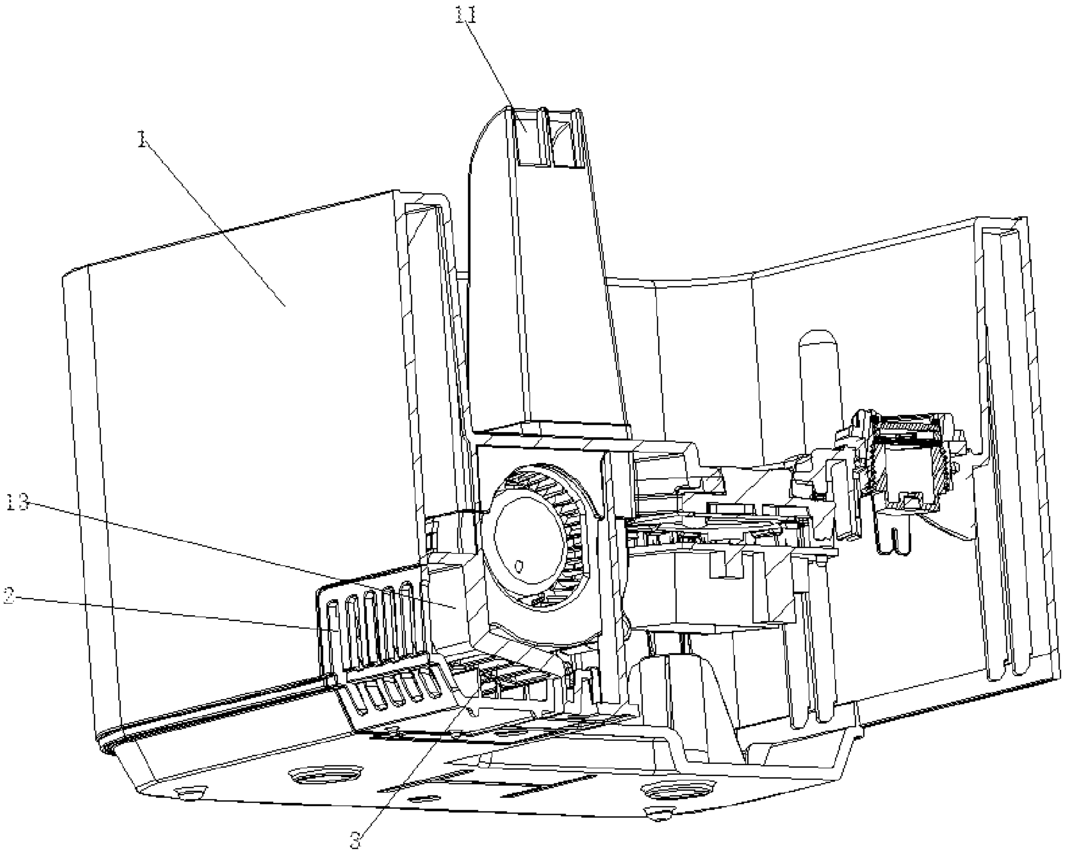
FIG. 4 illustrates a structural cross-sectional view of a second portion of a humidifier according to the present disclosure.
Figure 5:
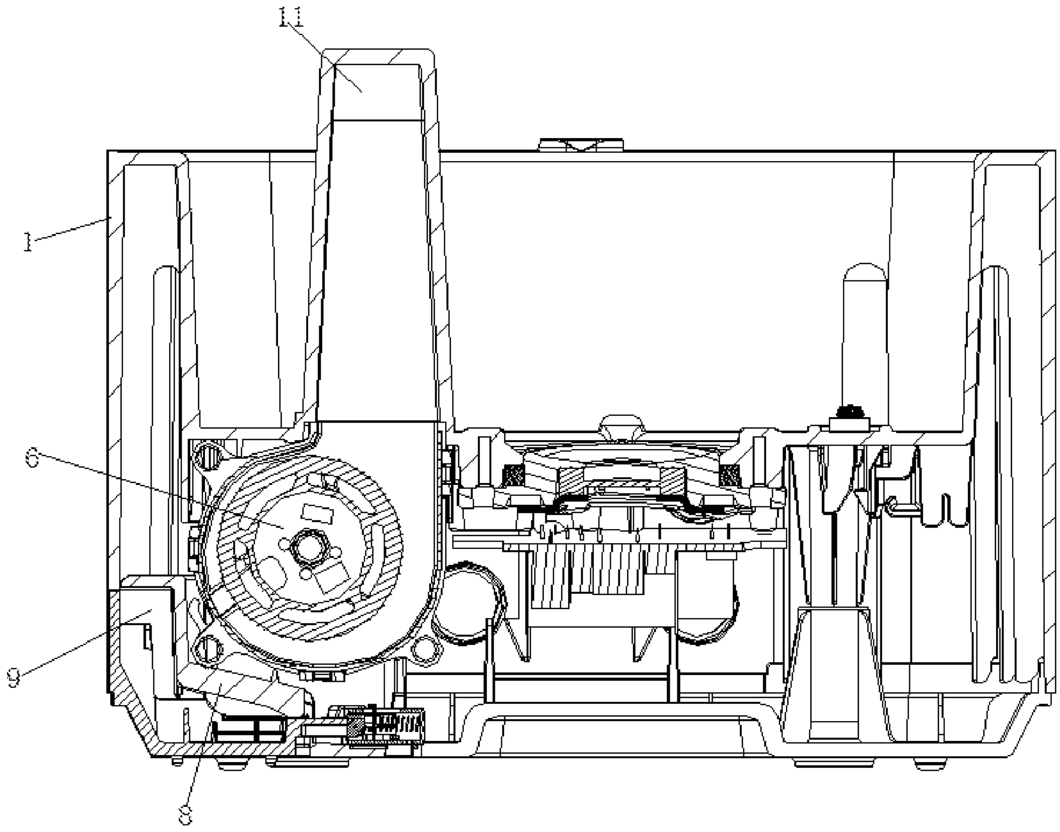
FIG. 5 illustrates a structural cross-sectional view of a third portion of a humidifier according to the present disclosure.

Specifically, as shown in FIG. 3 to FIG. 5, in this embodiment, the plane at which the first air inlet 2 is located and the plane at which the second air inlet 3 is located are arranged spatially perpendicular to each other. Through the spatially perpendicular arrangement of the planes at which the first air inlet 2 and the second air inlet 3 are located, an area of the blocking surface 13 of the first air inlet 2 is larger through the arrangement of the blocking surface 13, so that better effects of noise isolation can be achieved, and the arrangement of the planes at which the first air inlet 2 and the second air inlet 3 are located in space can be more convenient. As an alternative implementation, in some embodiments, the plane at which the first air inlet 2 is located and the plane at which the second air inlet 3 is located are arranged at an acute angle or an obtuse angle.

In order to make the air fresher, in this embodiment, an aromatherapy cavity 9 is formed between the humidifier body 1 and the inner tub 12. By forming the aromatherapy cavity 9 between the humidifier body 1 and the inner tub 12, the external air passes through the aromatherapy cavity 9 when entering the air passage from the inner tub 12, so that the air can be fresher. As an alternative implementation, in some embodiments, the humidifier body 1 and the inner tub 12 are merely spaced apart from each other without disposing the aromatherapy cavity.

In some embodiments, as shown in FIG. 5, in this embodiment, an aromatherapy box is disposed in the aromatherapy cavity 9. A plurality of support strips 14 are disposed at a bottom of the aromatherapy cavity 9. The support strips 14 are provided with through holes. By arranging the support strips 14 at the bottom of the aromatherapy cavity 9 and providing the through holes on the support strips 14, the water droplets in the air passage can conveniently flow from the second air inlet 3 to the first air inlet 2.

In this embodiment, the first air inlet 2 is disposed above a plane at which the support strips 14 are located. In some embodiments, in order to cause the water droplets to better flow out of the humidifier, in this embodiment, an end of the first air inlet 2 extends to the plane at which bottom end surfaces of the support strips 14 are located. By extending the first air inlet 2 to the plane at which the support strips 14 are located, the water droplets can directly flow out of the humidifier from the first air inlet 2, so that the water droplets can be prevented from remaining in the humidifier. As an alternative implementation, in some embodiments, the first air inlet 2 further extends downward to a lower part of the plane at which the support strips are located. In this case, a support plate under the support strips can be directly observed by means of the first air inlet 2.

In order to clean the water droplets in the air passage of the humidifier more completely, in this embodiment, a bottom of the air passage is further provided with a drainage outlet 4. A position of the drainage outlet 4 is lower than a position of the second air inlet 3. As an alternative implementation, in some embodiments, the bottom of the air passage is not provided with the drainage outlet 4. The external discharging of the water droplets is realized only by relying on a combination of the first air inlet 2 and the second air inlet 3.

In some embodiments, as shown in FIG. 3 and FIG. 4, in this embodiment, the first air inlet 2 is disposed on a sidewall of the humidifier body 1, and extends to a base of the humidifier body 1 from the sidewall. The blocking surface 13 of the inner tub 12 is disposed opposite to the sidewall of the humidifier body 1. The second air inlet 3 on the inner tub 12 is disposed on a bottom wall of the inner tub 12. As an alternative implementation, in some embodiments, the blocking surface 13 of the inner tub 12 extends in an extending direction of the first air inlet 2. The blocking surface 13 is completely disposed opposite to the first air inlet 2. The second air inlet 3 is completely staggered with the first air inlet 2.

Figure 6:
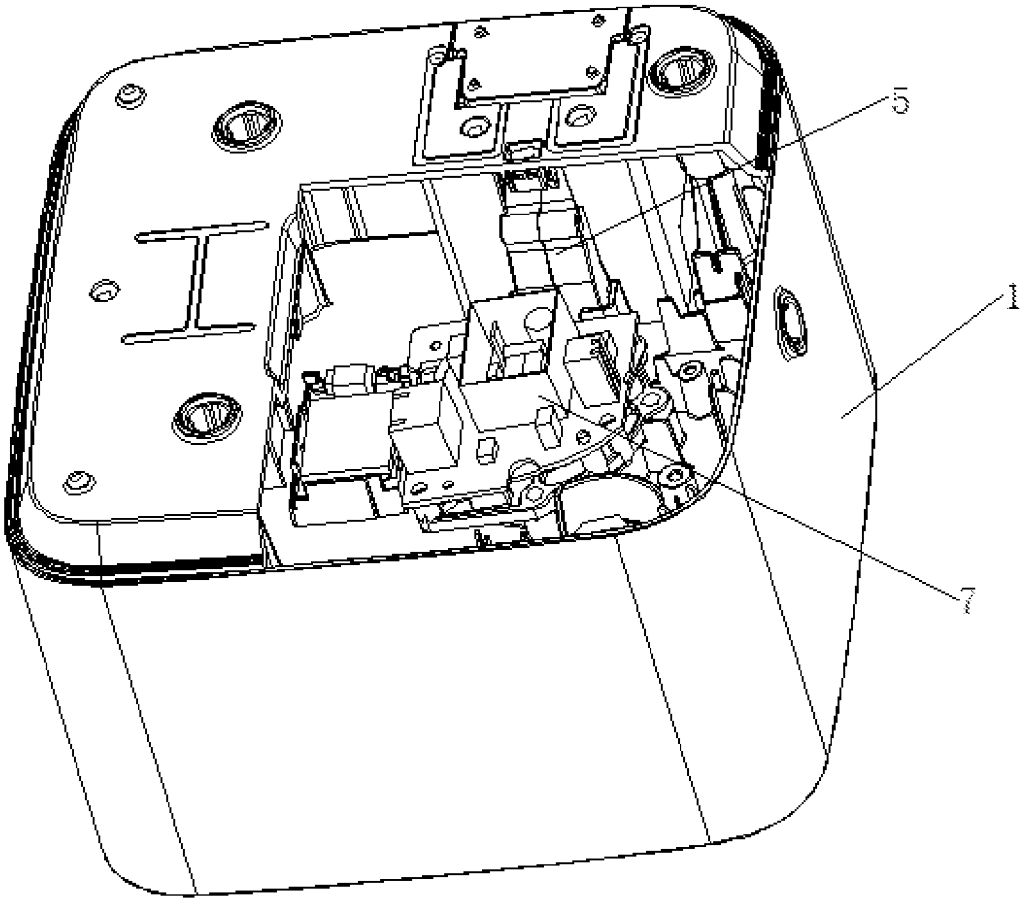
FIG. 6 illustrates a schematic structural diagram of a fourth portion of a humidifier according to the present disclosure.

As shown in FIG. 6, in this embodiment, the humidifier further includes an electrical element 7. The electrical element is disposed in the humidifier body 1 and located outside the air passage. By disposing the electrical element 7 outside the air passage, the air passage can isolate the water droplets to the outside of the electrical element 7, so that the water droplets can be prevented from being in contact with the electrical element 7 to cause potential safety hazards.

In this embodiment, the air passage includes an air passage body 8. The air passage body 8 is disposed in the inner tub 12. An accommodating cavity is enclosed by the air passage body 8 and communicated with the second air inlet 3. The fan 5 is disposed in the accommodating cavity. By disposing the air passage body 8, the accommodating cavity is enclosed by the air passage body 8, and the fan 5 is disposed in the accommodating cavity, so that a structure of the air passage is simpler. As an alternative implementation, in some embodiments, the two air passage bodies 8 are respectively a first air passage body 8 and a second air passage body 8. The first air passage body 8 is disposed on one side of the fan 5, and the second air passage body 8 is disposed on the other side of the fan 5. The accommodating cavity is enclosed jointly by the first air passage body 8 and the second air passage body 8. As an alternative implementation, in some embodiments, the inner tub 12 is a part of the air passage body. The blocking surface 13 is a sidewall of the air passage body opposite to the first air inlet 2.

In this embodiment, the fan 5 has two air inlets 6. The air inlets are respectively disposed on the two sides of the fan 5. Specifically, in this embodiment, the fan 5 is a double inlet centrifugal fan. By disposing two air inlets 6 in the fan 5, and respectively disposing the air inlets on the two sides of the fan 5, air can simultaneously enter the two sides of the fan 5, which enlarges an air inlet area of the fan 5. Therefore, water mist in the humidifier can be blown higher by the fan 5, and a humidification area of the humidifier can be enlarged. In this way, the mist can be prevented from only blowing to accessories of the humidifier while not able to humidify a larger area. Therefore, a humidification effect is enhanced, and user experience is improved. As an alternative implementation, in some embodiments, the fan 5 adopts single air inlet.

Figure 7:
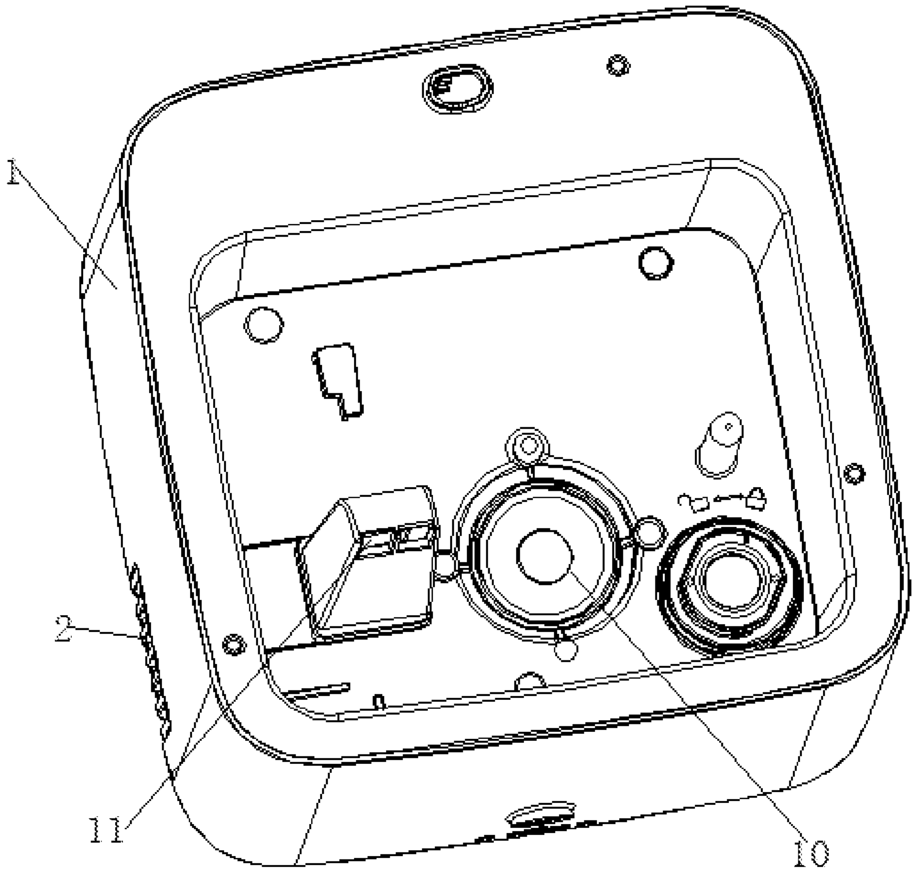
FIG. 7 illustrates a schematic structural diagram of a fifth portion of a humidifier according to the present disclosure.

As shown in FIG. 7, in this embodiment, the humidifier further includes an atomizing device 10. The atomizing device is disposed in the humidifier body 1. An air outlet 11 of the fan 5 is disposed at the atomizing device 10. The water mist of the atomizing device 10 is blown to the outside of the humidifier through the outlet air of the fan 5, so that an application environment of a user can be humidified.

It is apparent that the above embodiments are merely examples for clear description, and are not intended to limit the implementations. For those of ordinary skill in the art, changes or modifications in other different forms can also be made on the basis of the above description. It is unnecessary and impossible to enumerate all the embodiments herein. The obvious changes or modifications derived from thereby are still within the protection scope of the present disclosure.

What is claimed:

1. A humidifier, comprising:

a humidifier body, provided with a first air inlet;

a inner tub, disposed inside the humidifier body, wherein an air passage is disposed inside the inner tub, a fan is disposed in the air passage, the inner tub is provided with a second air inlet, the second air inlet and the first air inlet are communicated with an air inlet of the fan, a portion of the inner tub above the second air inlet is provided with a blocking surface, wherein the blocking surface opposites to at least part of the first air inlet;

wherein an aromatherapy cavity is formed between the humidifier body and the inner tub;

wherein a plurality of support strips are disposed at a bottom of the aromatherapy cavity, and the plurality of support strips are provided with a through hole.

2. The humidifier according to claim 1, wherein a plane at which the first air inlet is located and a plane at which the second air inlet is located are disposed spatially at an angle.

3. The humidifier according to claim 2, wherein the plane at which the first air inlet is located and the plane at which the second air inlet is located are disposed spatially perpendicular to each other.

4. The humidifier according to claim 1, wherein an end of the first air inlet extends to a plane at which bottom end surfaces of the plurality of support strips are located.

5. The humidifier according to claim 1, further comprising an electrical element, wherein the electrical element is disposed in the humidifier body and located outside the air passage.

6. The humidifier according to claim 1, wherein the air passage comprises an air passage body, an accommodating cavity is enclosed by the air passage body, the accommodating cavity is communicated with the second air inlet, and the fan is disposed in the accommodating cavity.

7. The humidifier according to claim 1, wherein the fan has two air inlets, and the two air inlets are respectively disposed on two sides of the fan.

8. The humidifier according to claim 1, further comprising an atomizing device, wherein the atomizing device is disposed in the humidifier body, and an air outlet of the fan is disposed at the atomizing device.

9. The humidifier according to claim 1, further comprising at least one drainage outlet, wherein the at least one drainage outlet is disposed at a bottom of the air passage.

10. The humidifier according to claim 2, further comprising an electrical element, wherein the electrical element is disposed in the humidifier body and located outside the air passage.

11. The humidifier according to claim 3, further comprising an electrical element, wherein the electrical element is disposed in the humidifier body and located outside the air passage.

12. The humidifier according to claim 2, wherein the air passage comprises an air passage body, an accommodating cavity is enclosed by the air passage body, the accommodating cavity is communicated with the second air inlet, and the fan is disposed in the accommodating cavity.

13. The humidifier according to claim 3, wherein the air passage comprises an air passage body, an accommodating cavity is enclosed by the air passage body, the accommodating cavity is communicated with the second air inlet, and the fan is disposed in the accommodating cavity.

14. The humidifier according to claim 2, further comprising an atomizing device, wherein the atomizing device is disposed in the humidifier body, and an air outlet of the fan is disposed at the atomizing device.

15. The humidifier according to claim 3, further comprising an atomizing device, wherein the atomizing device is disposed in the humidifier body, and an air outlet of the fan is disposed at the atomizing device.

* * * * *